US010302939B2

(12) United States Patent
Morohashi et al.

(10) Patent No.: US 10,302,939 B2
(45) Date of Patent: May 28, 2019

(54) PROJECTION DEVICE AND HEAD-UP DISPLAY DEVICE

(71) Applicant: NIPPON SEIKI CO., LTD., Niigata (JP)

(72) Inventors: Kazuo Morohashi, Niigata (JP); Megumi Sato, Niigata (JP); Yuichi Takahashi, Niigata (JP); Kazuya Matsuura, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 152 days.

(21) Appl. No.: 15/504,591

(22) PCT Filed: Aug. 7, 2015

(86) PCT No.: PCT/JP2015/072526
§ 371 (c)(1),
(2) Date: Feb. 16, 2017

(87) PCT Pub. No.: WO2016/027706
PCT Pub. Date: Feb. 25, 2016

(65) Prior Publication Data
US 2017/0235138 A1    Aug. 17, 2017

(30) Foreign Application Priority Data

Aug. 20, 2014 (JP) ................................. 2014-167780

(51) Int. Cl.
*G02B 27/01* (2006.01)
*G03B 21/28* (2006.01)
(Continued)

(52) U.S. Cl.
CPC .......... *G02B 27/0101* (2013.01); *B60K 35/00* (2013.01); *G03B 21/28* (2013.01);
(Continued)

(58) Field of Classification Search
CPC ................ G02B 27/01; G02B 27/0101; G02B 27/0112; G02B 27/013; G02B 27/0136;
(Continued)

(56) References Cited

U.S. PATENT DOCUMENTS

| 4,812,028 A | * | 3/1989 | Matsumoto | ........ G02B 17/0828 359/366 |
| 2011/0175798 A1 | * | 7/2011 | Sato | ....................... B60K 35/00 345/7 |

(Continued)

FOREIGN PATENT DOCUMENTS

| JP | H07-5886 U | 1/1995 |
| JP | H07-257228 A | 10/1995 |

(Continued)

OTHER PUBLICATIONS

Search Report issued in corresponding International Patent Application No. PCT/JP2015/072526, dated Oct. 20, 2015.

*Primary Examiner* — William R Alexander
*Assistant Examiner* — Ephrem Z Mebrahtu
(74) *Attorney, Agent, or Firm* — McDermott Will & Emery LLP (57) ABSTRACT

The present invention is compact and inexpensive, has good light efficiency, and enables a display image having a plurality of display distances to be displayed. A display emits projection light for displaying a display image at a predetermined position, and an image formation position adjusting mirror receives the projection light emitted from the display, performs conversion into a plurality of first projection light and second projection light that have different image formation distances by changing the image formation distance of the projection light that is at least part of the incident projection light, and reflects the first projection light and the second projection light to project the first (Continued)

projection light and the second projection light onto a first screen and a second screen.

13 Claims, 4 Drawing Sheets (51) Int. Cl.
*H04N 9/31* (2006.01)
*B60K 35/00* (2006.01)
*H04N 13/30* (2018.01)
*G02B 27/10* (2006.01)

(52) U.S. Cl.
CPC ........... *H04N 9/3141* (2013.01); *H04N 13/30* (2018.05); *B60K 2350/2052* (2013.01); *G02B 27/106* (2013.01); *G02B 2027/0187* (2013.01)

(58) Field of Classification Search
CPC .... G02B 2027/0185; G02B 2027/0141; G02B 2027/0127; G02B 27/0179; G02B 27/0977; G02B 27/0983; G02B 27/106; G03B 21/2066; B60K 35/00; B60K 2350/2052; G06F 2203/04803
See application file for complete search history.

(56) References Cited

U.S. PATENT DOCUMENTS

| 2012/0019781 A1* | 1/2012 | Kuhlman | B60K 35/00 353/13 |
|---|---|---|---|
| 2016/0178902 A1* | 6/2016 | Ando | B60K 35/00 348/115 |

FOREIGN PATENT DOCUMENTS

| JP | 2003-237412 A | 8/2003 |
|---|---|---|
| JP | 2004-133181 A | 4/2004 |
| JP | 2012-163613 A | 8/2012 |
| JP | 2013-111999 A | 6/2013 |

* cited by examiner

FIG.4

PROJECTION DEVICE AND HEAD-UP DISPLAY DEVICE

CROSS REFERENCE

This application is the U.S. National Phase under 35 U.S.C. § 371 of International Application No. PCT/JP2015/072526, filed on Aug. 7, 2015, which claims the benefit of Japanese Application No. 2014-167780, filed on Aug. 20, 2014, the entire contents of each are hereby incorporated by reference.

TECHNICAL FIELD

The present invention relates to a projection device for projecting an image onto a predetermined position and a head-up display device for throwing the image projected by the projection device onto a reflective transmissive surface to cause the image to be visually recognized with a scenery.

BACKGROUND ART

A conventional head-up display device is disclosed in, for example, PTL 1. Such a head-up display device includes first and second displays and a half mirror and is a device for overlapping and projecting transmitted light and reflected light with the use of the half mirror, thereby causing a user to visually recognize display images (virtual images) at different display distances.

CITATION LIST

Patent Literature

PTL 1: JP-A-2003-237412

SUMMARY OF INVENTION

Technical Problem(s)

However, the head-up display device disclosed in PTL 1 includes a plurality of displays, and therefore a volume of the head-up display device may be increased and a cost thereof may be increased. Further, because the half mirror is used, use efficiency of display light emitted from the displays may be reduced.

The invention has been made in view of the above problems and provides a compact and inexpensive projection device and head-up display device having a high light efficiency and capable of displaying display images having a plurality of display distances.

Solution to Problem(s)

In order to solve the above problems, a projection device according to a first viewpoint of the invention is a projection device including: a display configured to emit projection light for displaying a display image at a predetermined position; and an image formation position adjusting mirror configured to receive the projection light emitted from the display, convert the projection light into a plurality of beams of projection light having different image formation distances by changing an image formation distance of at least a part of the incident projection light, and reflect the plurality of beams of projection light.

Further, a head-up display device according to a second viewpoint of the invention is a head-up display device for projecting a display image onto a projection surface to cause the display image to be visually recognized as a virtual image, the head-up display device including: a projection unit configured to emit projection light; an image formation position adjusting mirror configured to receive the projection light emitted from the projection unit, convert the projection light into a plurality of beams of projection light having different image formation distances by changing an image formation distance of at least a part of the incident projection light, and reflect the plurality of beams of projection light; a first screen configured to form a part of the projection light having a longer image formation distance; and a second screen configured to form a part of the projection light having a shorter image formation distance, the second screen being placed at a position away from the projection surface than the first screen.

Advantageous Effects of Invention

It is possible to provide a compact and inexpensive projection device and head-up display device having a high light efficiency and capable of displaying display images having a plurality of display distances.

DESCRIPTION OF EMBODIMENTS

Hereinafter, an embodiment of a head-up display device (hereinafter, referred to as "HUD device") 100 and a projection device 20 according to the invention will be described with reference to attached drawings.

Figure 1:
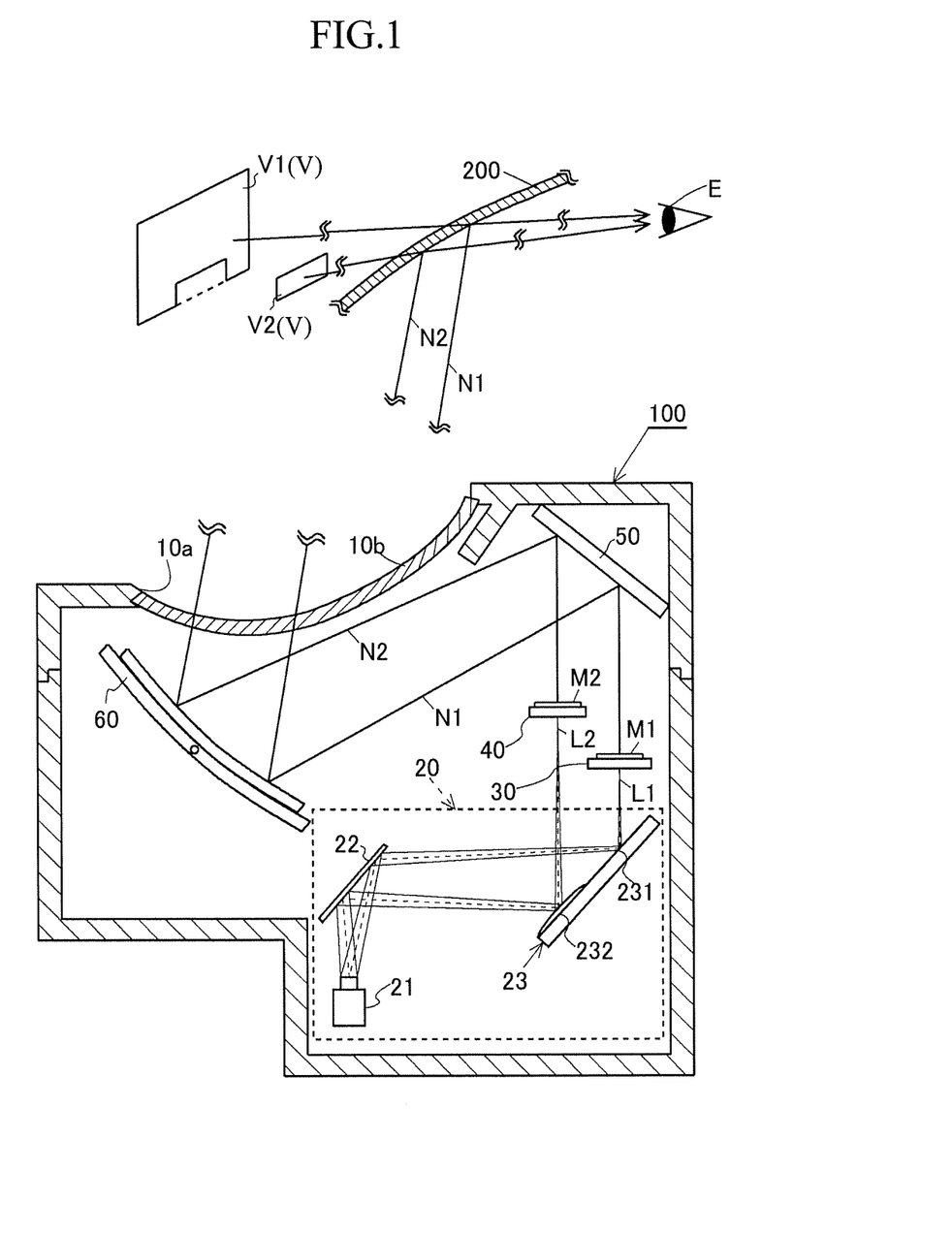
FIG. 1 is a schematic view showing an embodiment of the invention.

The HUD device 100 is provided in, for example, an automobile and, as shown in FIG. 1, includes a housing 10, the projection device 20, a first screen (first image formation unit) 30, a second screen (second image formation unit) 40, a plane mirror (relay optical system) 50, a concave mirror (relay optical system) 60, and a control circuit board (not shown). The HUD device 100 reflects a first display image M1 projected by the projection device 20 onto the first screen 30 and a second display image M2 projected by the projection device 20 as well onto the second screen 40 toward a windshield 200 of a vehicle with the use of the plane mirror 50 and the concave mirror 60, thereby displaying a first virtual image V1 of the first display image M1 and a second virtual image V2 of the second display image M2 to a user E.

The housing 10 is made of, for example, a black light-shielding synthetic resin and stores the projection device 20, the first screen 30, the second screen 40, the plane mirror 50, and the concave mirror 60 therein, and the control circuit board (not shown) is attached to the exterior thereof.

The housing 10 has an opening portion 10a allowing display light N described below to pass therethrough toward the windshield 200, and the opening portion 10a is covered with a light transmitting cover 10b.

The projection device 20 emits first projection light L1 showing the first display image M1 described below and second projection light L2 showing the second display image M2 toward the first screen 30 and the second screen 40 described below, thereby forming the first display image M1 and the second display image M2 on the first screen 30 and the second screen 40. A detailed configuration of the projection device 20 will be described in detail below.

Figure 2:
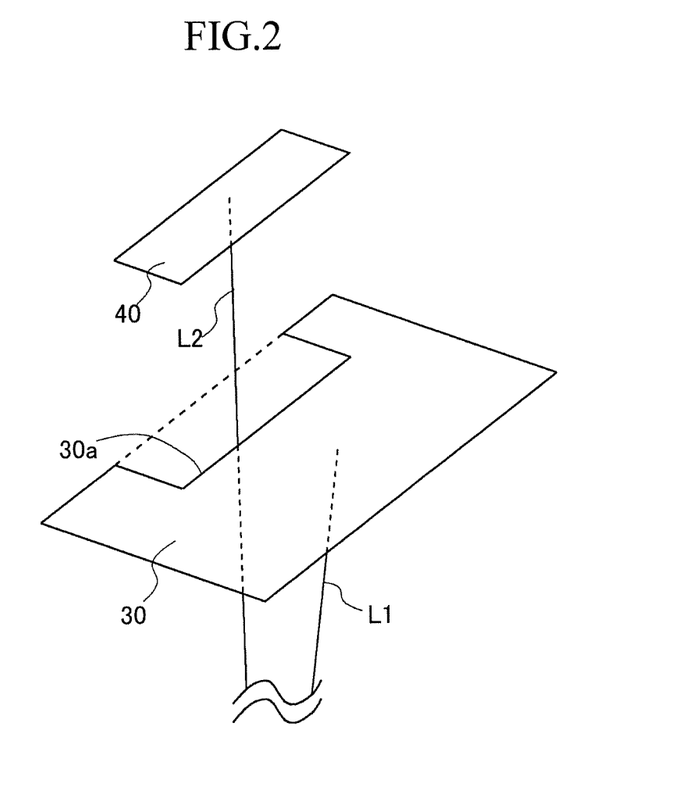
FIG. 2 shows a configuration of a first screen and a second screen in the above embodiment.

The first screen (first image formation unit) 30 is a transmitting screen for receiving the first projection light L1 emitted from the projection device 20 on a rear surface and displaying the first display image M1 on a surface side and is made up of, for example, a holographic diffuser, a microlens array, or a diffusion plate. When the first screen 30 displays the first display image M1, first display light N1 showing the first display image M1 is projected onto the windshield 200 by the plane mirror 50 and the concave mirror 60 described below and is reflected by the windshield 200 toward a direction of the user E (eye box). With this, the user E can visually recognize the first virtual image V1 on the other side of the windshield 200. Note that, as shown in FIG. 2, the first screen 30 in this embodiment has a recessed display area having a cut-out portion 30a obtained by cutting out a part of an edge portion of a substantially rectangular shape so that the part thereof has a rectangular shape. Therefore, the first virtual image V1 also has a recessed display area. Note that, as shown in FIG. 2, the second projection light L2 described below passes through the cut-out portion 30a of the first screen 30 to reach the second screen 40 described below.

The second screen (second image formation unit) 40 is formed to have a rectangular shape substantially similar to that of the cut-out portion 30a of the first screen 30 and is a transmitting screen for receiving the second projection light L2 emitted from the projection device 20 on a rear surface and displaying the second display image M2 on a surface side. The second screen 40, as well as the first screen 30, is made up of, for example, a holographic diffuser, a microlens array, or a diffusion plate. When the second screen 40 displays the second display image M2, second display light N2 showing the second display image M2 is projected onto the windshield 200 by the plane mirror 50 and the concave mirror 60 described below, and the second virtual image V2 is displayed on the other side of the windshield 200, seen from the user E.

As shown in FIG. 1, the first screen 30 is placed to be closer to the projection device 20 than the second screen 40. That is, an optical path length of the first display light N1 travelling toward the user E from the first screen 30 is longer than an optical path length of the second display light N2 travelling toward the user E from the second screen 40. Therefore, a distance (display distance) between the user E and a position at which the first virtual image V1 is displayed is longer than a distance (display distance) between the user E and a position at which the second virtual image V2 is displayed, and thus the HUD device 100 in this embodiment can perform display so that the first virtual image V1 positions farther than the second virtual image V2. Note that, in this embodiment, the display distance of the first virtual image V1 is 5 meters, and the display distance of the second virtual image V2 is 2 meters.

The first screen 30 is placed to have a predetermined angle (including 0 degree) with respect to an optical axis of the first display light N1 travelling to the user E from the first screen 30, and, similarly, the second screen 40 is placed to have a predetermined angle (including 0 degree) with respect to an optical axis of the second display light N2 travelling to the user E from the second screen 40. Note that, even in the case where the first screen 30 (second screen 40) has the predetermined angle with respect to the optical axis of the first display light N1, the first virtual image V1 and the second virtual image V2 are formed by a free-form surface of the concave mirror 60 described below so that the first virtual image V1 and the second virtual image V2 face to each other while being substantially perpendicular to a line of forward sight of the user E. In the case where the user E visually recognizes the first virtual image V1 (second virtual image V2), a display distance is constant from any area in the first virtual image V1 (second virtual image V2), and therefore the user can visually recognize the whole first virtual image V1 (second virtual image V2) with ease without moving the user's focal point.

The plane mirror (relay optical system) 50 is obtained by forming a reflective film on a surface of a base made of, for example, a synthetic resin or a glass material by using depositing or other means and reflects the first display light N1 and the second display light N2 emitted from the first screen 30 and the second screen 40 toward the concave mirror 60.

The concave mirror (relay optical system) 60 is obtained by forming a reflective film on a surface of a base made of, for example, a synthetic resin material by using depositing or other means and is a mirror having a recessed free-form surface that further reflects the first display light N1 and the second display light N2 reflected by the plane mirror 50 to emit the first display light N1 and the second display light N2 toward the windshield 200. The first display light N1 and the second display light N2 reflected by the concave mirror 60 are transmitted through the light transmitting cover 10b provided in the opening portion 10a of the housing 10 and reach the windshield 200. The first display light N1 and the second display light N2 reflected by the windshield 200 form the first virtual image V1 and the second virtual image V2 at positions in front of the windshield 200. With this, the HUD device 100 can cause the user E to visually recognize both the virtual images V (first virtual image V1 and second virtual image V2) and outside scenery or the like actually existing in front of the windshield 200. Note that the concave mirror 60 has a function of a magnifying glass and magnifies the display images M displayed by the projection device 20 to reflect the display images M toward the windshield 200. That is, the first virtual image V1 and the second virtual image V2 visually recognized by the user E are enlarged images of the first display image M1 and the second display image M2 displayed by the projection device 20. The concave mirror 60 also has a function of reducing distortion of the first virtual image V1 and the second virtual image V2 caused by the windshield 200 which is a curved surface. Hereinafter, a specific configuration of the projection device 20 will be described.

As shown in FIG. 1, the projection device 20 includes a display 21 for generating and emitting the first projection light L1 and the second projection light L2, a fold mirror 22 for reflecting the first projection light L1 and the second projection light L2 incident thereon from the display 21 to turn back the first projection light L1 and the second projection light L2, and an image formation position adjusting mirror 23 for adjusting image formation distances of the light incident thereon from the fold mirror 22 and forms the first projection light L1 and the second projection light L2 on the first screen 30 and the second screen 40, respectively, which are away from the projection device 20 at different distances.

The display 21 has a reflective display element such as a DMD (Digital MicroMirror Device) or LCOS (registered trademark: Liquid Crystal On Silicon) or a transmissive display element such as a TFT (Thin Film transistor) liquid crystal panel and emits the first projection light L1 and the second projection light L2 for displaying the first display image M1 and the second display image M2 toward the fold mirror 22 on the basis of control signals from the control circuit board (not shown). Note that the display 21 is controlled to display the display images M (first display image M1 and second display image M2) distorted in advance in consideration of an optical characteristic, placement, and the like of each optical member so as to prevent the virtual images V (first virtual image V1 and second virtual image V2) from being distorted when the virtual images V are visually recognized by the user E via the first screen 30, the second screen 40, the plane mirror 50, the concave mirror 60, the windshield 200, and the like.

The fold mirror 22 is obtained by forming a reflective film on a surface of a base made of, for example, a synthetic resin or a glass material by using depositing or other means and is a plane mirror for reflecting the first projection light L1 and the second projection light L2 emitted from the display 21 toward the image formation position adjusting mirror 23 described below. Because the fold mirror 22 is provided, a package of the projection device 20 can be more compact. Note that a plurality of fold mirrors 22 may be provided between the display 21 and the image formation position adjusting mirror 23, or no fold mirror 22 may be provided.

The image formation position adjusting mirror 23 is obtained by forming a reflective film on a surface of a base made of, for example, a synthetic resin material or a glass material by using depositing or other means and has a first reflection surface 231 for receiving the first projection light L1 and a second reflection surface 232 for receiving the second projection light L2 on the same base. In this embodiment, the first reflection surface 231 has a reflection surface that is a flat surface and reflects the received first projection light L1 toward the first screen 30 without changing the image formation distance, thereby forming the first display image M1 on the surface side of the first screen 30. Meanwhile, the second reflection surface 232 has a reflection surface that is a projected free-form surface and reflects the received second projection light L2 toward the second screen 40 while changing the image formation distance so that the image formation distance is increased, thereby forming the second display image M2 on the surface side of the second screen 40.

That is, in the image formation position adjusting mirror 23 in this embodiment, the first reflection surface 231 for reflecting the first projection light L1 and the second reflection surface 232 for reflecting the second projection light L2 have different curved surface shapes, and therefore the image formation distances of the first projection light L1 and the second projection light L2 can be made different only by receiving the projection light L from the single display 21. Therefore, the first virtual image V1 and the second virtual image V2 visually recognized by the user E can be displayed at different display distances, and therefore it is possible to differentiate between information displayed as the first virtual image V1 and information displayed as the second virtual image V2, which improves distinguishability of the information. Further, the image formation distances of at least the first projection light L1 and the second projection light L2 emitted from the same display 21 can be made different, and therefore it is possible to reduce a cost, as compared with the case where a plurality of displays are provided.

Because the first reflection surface 231 and the second reflection surface 232 in the image formation position adjusting mirror 23 are formed on the same base, the image formation distances of the at least first projection light L1 and second projection light L2 can be made different only by irradiating the image formation position adjusting mirror 23 with the projection light L from the display 21. Therefore, it is possible to save a space without complicating an optical path of the projection light L.

The image formation position adjusting mirror 23 in this embodiment has, on the same base, the first reflection surface 231 and the second reflection surface 232 for making different image formation distances between the first projection light L1 and the second projection light L2, and therefore relative positions between the first reflection surface 231 and the second reflection surface 232 are hardly shifted due to an assembly error or the like, and it is possible to accurately form the first projection light L1 and the second projection light L2 on the first screen 30 and the second screen 40.

The display 21 in this embodiment does not project the projection light L for generating an image onto the vicinity of a boundary between the first reflection surface 231 and the second reflection surface 232 of the image formation position adjusting mirror 23. With this configuration, even in the case where a projection position of the projection light L onto the image formation position adjusting mirror 23 is shifted due to an assembly error, vibration, or the like of the HUD device 100, it is possible to prevent the first display image M1 to be thrown to the first screen 30 from being thrown to the second screen 40.

A part (first reflection surface 231) of the image formation position adjusting mirror 23 in this embodiment has a flat surface, and therefore it is possible to reflect the projection light L projected from the display 21 without distorting the projection light L. Further, it is possible to easily design and manufacture the image formation position adjusting mirror 23 and reduce design and manufacturing costs.

Hereinabove, the HUD device 100 in this embodiment has been described, but the invention is not limited by the above embodiment and drawings. Needless to say, the above embodiment and drawings can be changed (including deletion of constituent elements). Hereinafter, modification examples will be described.

In the above embodiment, the first reflection surface 231 has been described as a flat surface, and the second reflection surface 232 has been described as a projected free-form surface, but the first reflection surface 231 and the second reflection surface 232 are not limited thereto because the first reflection surface 231 and the second reflection surface 232 only need to have shapes that can make different image formation distances between the first projection light L1 and the second projection light L2. When the reflection surface is formed to have a projected shape, the image formation distance can be increased, and, when the reflection surface is formed to have a recessed shape, the image formation distance can be reduced. Note that the first reflection surface 231 and the second reflection surface 232 do not need to have the same curved surface shape in the whole reflection areas and may have different shapes in the respective reflection areas.

Figure 3:
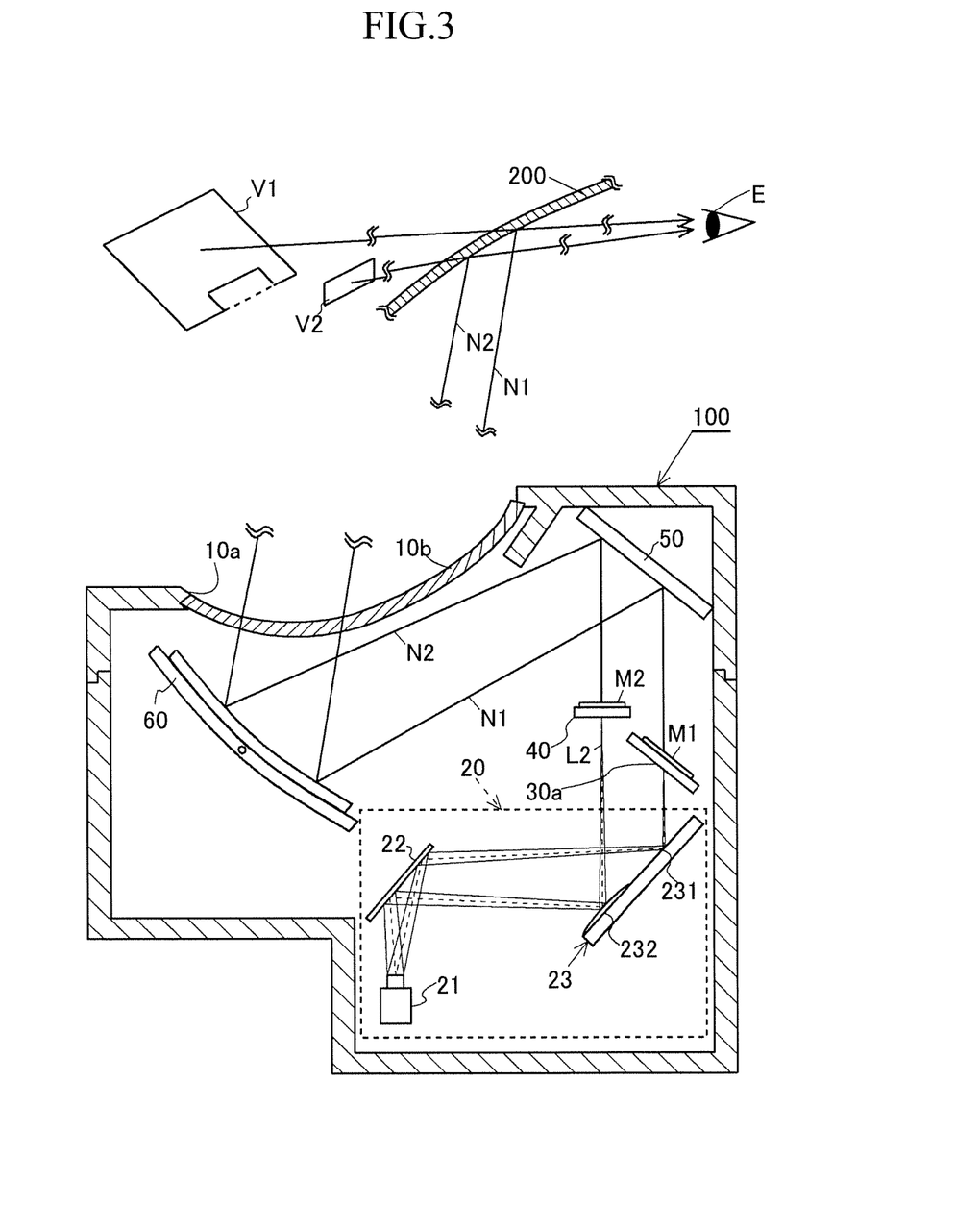
FIG. 3 is a schematic view showing a modification example of the invention.

In the above embodiment, the first screen 30 is placed to have the predetermined angle with respect to the optical axis of the first display light N1 travelling to the user E from the first screen 30, and, similarly, the second screen 40 is placed to have a predetermined angle with respect to the optical axis of the second display light N2 travelling to the user E from the second screen 40, but the first screen 30 and the second screen 40 are not limited thereto. The first screen 30 or/and the second screen 40 may be placed to be inclined at an angle equal to or larger than the predetermined angle with respect to the optical axis of the first display light N1 (second display light N2) travelling to the user E. Specifically, as shown in FIG. 3, it is possible to gradually change the image formation distance of the first projection light L1 by placing the first screen 30 so that the first screen 30 is inclined at an angle equal to or larger than the predetermined angle with respect to the optical axis of the first display light N1 and gradually changing the curved surface shape of the first reflection surface 231 in consideration of an optical path length of the first projection light L1 between the first screen 30 placed to be inclined and the display 21. Therefore, even in the case where the first screen 30 is inclined at an angle equal to or larger than the predetermined angle with respect to the optical axis, it is possible to form the first display image M1 in a wide range (including the whole area) of the first screen 30, and it is possible to cause the user E to visually recognize the first virtual image V1 which is not blurred and causes the user E to feel the sense of depth.

Inclination of the first screen 30 to the optical axis of the first projection light L1 may be different from inclination of the second screen 40 to the optical axis of the second projection light L2. With this configuration, it is possible to three-dimensionally differentiate between two virtual images (first virtual image V1 and second virtual image V2), and therefore it is possible to cause the user E to distinctively recognize pieces of information with ease.

Figure 4:
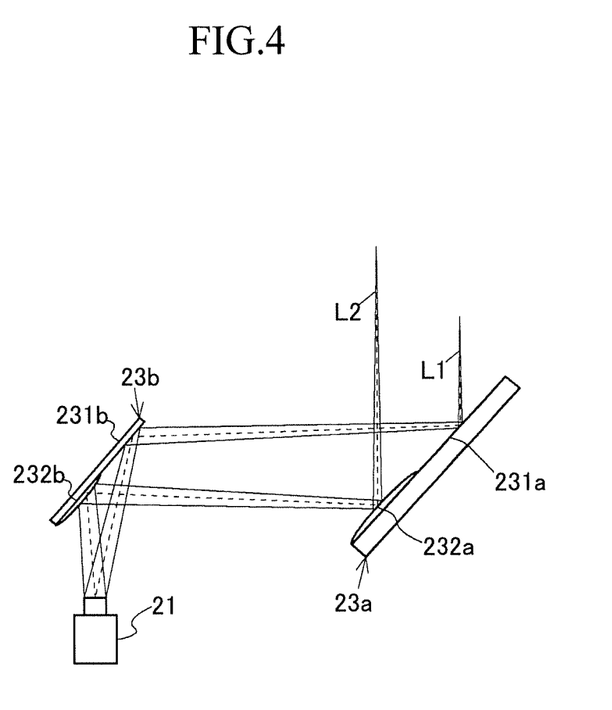
FIG. 4 shows a modification example of an image formation position adjusting mirror of the invention.

In the above embodiment, the image formation position adjusting mirror 23 for adjusting the image formation distance(s) of the first projection light L1 or/and the second projection light L2 emitted by the display 21 may be made up of a plurality of image formation position adjusting mirrors 23a and 23b as shown in FIG. 4.

In the above embodiment, the first reflection surface 231 and the second reflection surface 232 are placed on the same base, but the first reflection surface 231 and the second reflection surface 232 may be placed on different bases.

The first reflection surface 231 and the second reflection surface 232 may be made of a continuous reflective film, and the reflective film may not be formed in the vicinity of the boundary between the first reflection surface 231 and the second reflection surface 232.

In the above embodiment, the first screen 30 and the second screen 40 have a substantially rectangular shape, but the first screen 30 and the second screen 40 may have a polygonal shape such as a hexagonal shape or an octagonal shape.

In the above description, in order to easily understand the invention, description of publicly-known unimportant technical matters has been omitted as appropriate.

INDUSTRIAL APPLICABILITY

The invention is applicable to, for example, a head-up display device for vehicles.

REFERENCE SIGNS LIST

100 HUD device (head-up display device), 10 housing, 20 projection device, 21 display, 22 fold mirror, 23 image formation position adjusting mirror, 30 first screen, 40 second screen, 50 plane mirror, 60 concave mirror, L projection light, L1 first projection light, L2 second projection light, M1 first display image, M2 second display image, N1 first display light, N2 second display light, V virtual image, V1 first virtual image, V2 second virtual image

The invention claimed is:

1. A projection device, comprising:
a display configured to emit projection light representing a display image; and
an image formation position adjusting mirror comprising:
a first surface;
a second surface opposite the first surface;
a first reflection surface provided on the first surface, the first reflection surface having a first curvature, the first reflection surface receiving, from the display as a first projection light, a first part of the projection light and reflecting the first projection light toward a first screen, the first projection light traveling a first image formation distance extending between the first reflection surface and the first screen; and
a second reflection surface provided on the first surface, the second reflection surface having a second curvature different from the first curvature, the second reflection surface receiving, from the display as a second projection light, a second part of the projection light and reflecting the second projection light toward a second screen different from the first screen, the second projection light traveling a second image formation distance extending between the second reflection surface and the second screen,
wherein the second image formation distance is different from the first image formation distance.

2. The projection device according to claim 1, wherein the display does not project the projection light in a vicinity of a boundary between the first reflection surface and the second reflection surface.

3. The projection device according to claim 1, wherein any one of the first reflection surface and the second reflection surface is a flat surface.

4. A head-up display device for projecting a display image onto a projection surface to cause the display image to be visually recognized as a virtual image, the head-up display device comprising:
a projection unit configured to emit projection light;
an image formation position adjusting mirror comprising:
a first surface;
a second surface opposite the first surface;
a first reflection surface provided on the first surface, the first reflection surface having a first curvature, the first reflection surface reflecting, as a first projection light, a first part of the projection light;
a second reflection surface provided on the first surface, the second reflection surface having a second curvature different from the first curvature, the second reflection surface reflecting, as a second projection light, a second part of the projection light;
a first screen configured to receive, from the first reflection surface, the first projection light and display a first display image represented by the first projection light; and
a second screen configured to receive, from the second reflection surface, the second projection light and display a second display image of the second projection light, the second screen being disposed farther away from the projection unit than the first screen,
wherein the first projection light traveling a first image formation distance extending between the first reflection surface and the first screen,
wherein the second projection light traveling a second image formation distance extending between the second reflection surface and the second screen, and wherein the second image formation distance is different from the first image formation distance.

5. The head-up display device according to claim 4, wherein
the projection unit does not project the projection light in a vicinity of a boundary between the first reflection surface and the second reflection surface.

6. The head-up display device according to claim 4, wherein
any one of the first reflection surface and the second reflection surface is a flat surface.

7. The head-up display device according to claim 4, wherein
the first screen comprises:
  a first receiving plane for receiving the first projection light from the first reflection surface; and
  a first image formation plane for displaying the first display image of the first projection light,
the first image formation plane disposed opposite the first receiving plane,
the first screen is disposed on a first optical axis of the first projection light so that the first image formation plane is disposed at a first angle with respect to the first optical axis,
the second screen comprises:
  a second receiving plane for receiving the second projection light from the second reflection surface; and
  a second image formation plane for displaying the second display image of the second projection light,
the second image formation plane disposed opposite the second receiving plane, and
the second screen is disposed on a second optical axis of the second projection light so that the second image formation plane is disposed at a second angle with respect to the second optical axis.

8. The head-up display device according to claim 7, wherein
the first angle between the first imaging plane and the first optical axis projection light is different from the second angle between the second imaging plane and the second optical axis.

9. The head-up display device according to claim 7, wherein
at least one of the first image formation distance of the first projection light and the second image formation distance of the second projection light changes in accordance with a change in an angle of view of the display image.

10. A projection device, comprising:
a display configured to emit projection light representing a display image; and
an image formation position adjusting mirror comprising:
  a first surface;
  a second surface opposite the first surface;
  a first reflection surface provided on the first surface, the first reflection surface having a first curvature, the first reflection surface reflecting, as a first projection light, a first part of the projection light to a first screen, the first projection light traveling a first image formation distance extending between the first reflection surface and the first screen; and
  a second reflection surface provided on the first surface, the second reflection surface having a second curvature different from the first curvature, the second reflection surface reflecting, as a second projection light, a second part of the projection light toward a second screen different from the first screen, the second projection light traveling a second image formation distance extending between the second reflection surface and the second screen,
wherein the second image formation distance is different from the first image formation distance,
wherein the first screen comprises a first image formation plane on which a first display image represented by the first projection light is displayed,
wherein the first screen is disposed on a first optical axis of the first projection light so that the first image formation plane is disposed at a first angle with respect to the first optical axis,
wherein the second screen comprises a second image formation plane which a second display image represented by the second projection light is displayed
wherein the second screen is disposed on a second optical axis of the second projection light so that the second image formation plane is disposed at a second angle with respect to the second optical axis.

11. A projection device according to claim 10, wherein
the first angle between the first imaging plane and the first optical axis projection light is different from the second angle between the second imaging plane and the second optical axis.

12. The projection device according to claim 11, wherein
at least one of the first image formation distance of the first projection light and the second image formation distance of the second projection light changes in accordance with a change in an angle of view of the display image.

13. The projection device according to claim 1, wherein
the second image formation distance is longer than the first image formation distance.

* * * * *